(12) United States Patent
Garces et al.

(10) Patent No.: US 10,842,162 B2
(45) Date of Patent: Nov. 24, 2020

(54) INDOOR SMOKER

(71) Applicant: Haier US Appliance Solutions, Inc., Wilmington, DE (US)

(72) Inventors: Tomas Garces, Louisville, KY (US); Samuel Vincent DuPlessis, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 115 days.

(21) Appl. No.: 15/969,935

(22) Filed: May 3, 2018

(65) Prior Publication Data
US 2019/0335774 A1 Nov. 7, 2019

(51) Int. Cl.
*A23B 4/052* (2006.01)
*A23L 5/10* (2016.01)
*B01D 53/86* (2006.01)

(52) U.S. Cl.
CPC .............. *A23B 4/0523* (2013.01); *A23L 5/17* (2016.08); *B01D 53/8643* (2013.01); *A23V 2002/00* (2013.01); *B01D 2255/1021* (2013.01); *B01D 2255/1023* (2013.01); *B01D 2255/1025* (2013.01)

(58) Field of Classification Search
CPC ......... A23B 4/044; A23B 4/056; A23B 4/048; A23B 4/052; A23B 4/0523; A47J 37/0629; A47J 37/0709
USPC ......... 99/352, 425, 444, 445, 446, 467, 473, 99/481, 482
See application file for complete search history.

(56) References Cited

U.S. PATENT DOCUMENTS

| 4,934,260 | A | 6/1990 | Blevins |
| 6,868,777 | B1 | 3/2005 | Higgins et al. |
| 2014/0216268 | A1* | 8/2014 | Burch ................... F24C 15/18 99/352 |
| 2016/0360762 | A1 | 12/2016 | Mann |

FOREIGN PATENT DOCUMENTS

JP 2008307217 A 12/2008

* cited by examiner

*Primary Examiner* — Phuong T Nguyen
(74) *Attorney, Agent, or Firm* — Dority & Manning, P.A.

(57) ABSTRACT

An indoor smoker includes a cabinet including an exhaust duct, a smoking chamber, a firebox, and a bypass duct extending between the firebox and the exhaust duct. The indoor smoker further includes a system of dampers and check valves to regulate the flow of smoke and air within the indoor smoker. A controller may regulate these features to terminate a smoking process by asphyxiating the combustible material and evacuating the smoking chamber, to pause a process by evacuating the smoking chamber while permitting bleed air into the smoldering chamber, or to continue a normal smoking operation.

12 Claims, 6 Drawing Sheets

INDOOR SMOKER

FIELD OF THE INVENTION

The present subject matter relates generally to indoor smokers, and more particularly to systems and methods of smoke regulation in indoor smokers.

BACKGROUND OF THE INVENTION

Conventional smokers include a smoking chamber and a firebox positioned within or fluidly coupled to the smoking chamber. The firebox is filled with a combustible material, such as wood or wood byproducts that are ignited or otherwise heated to generate smoke and/or heat. The heat and smoke are routed into the smoking chamber to impart flavor on and cook food items positioned within the smoking chamber. One or more heating elements may be positioned within the smoking chamber and the firebox to maintain the temperatures necessary both for cooking the food and for generating the desired amount of smoke.

During a cooking or smoking process, it is common to need to access the smoking chamber, e.g., to check the food, to take an internal temperature measurement, or to "mop" the food with sauce or marinade. It is also common to add additional food into the smoking chamber throughout a smoking or cooking process. Performing such actions may require a user to open the door multiple times during a cooking process. However, the smoking chamber is typically filled with smoke which would be released outside the smoking chamber if the door was opened. For conventional outdoor smokers, this released smoke may not create a problem. However, for indoor smokers, a user cannot open the door during a smoking cycle without releasing the smoke and potentially harmful volatile organic compounds (VOCs) into the indoor environment.

Accordingly, a smoker that has features for improved smoke regulation during a smoking operation would be useful. More specifically, an indoor smoker that has features allowing a user to pause, terminate, or continue a smoking process would be particularly beneficial.

BRIEF DESCRIPTION OF THE INVENTION

Aspects and advantages of the invention will be set forth in part in the following description, may be apparent from the description, or may be learned through practice of the invention.

In one aspect of the present disclosure, an indoor smoker is provided defining a vertical, a lateral, and a transverse direction. The indoor smoker includes a cabinet including an exhaust duct and an air handler operably coupled with the exhaust duct for urging a flow of smoke through the exhaust duct. A firebox defines a primary outlet, a bypass outlet, a firebox inlet, and a smoldering chamber for receiving combustible material and a bypass duct provides fluid communication between the bypass outlet and the exhaust duct. A smoking chamber is positioned within the cabinet and defines a chamber inlet in fluid communication with the primary outlet, a chamber outlet in fluid communication with the exhaust duct, and an air inlet. A controller is operably coupled to the air handler and is configured for receiving a command to evacuate the smoking chamber, closing the primary outlet of the firebox, and operating the air handler to evacuate the smoking chamber by urging a flow of air through the air inlet, into the smoking chamber, and out of the exhaust duct.

In another aspect of the present disclosure, a method of operating an indoor smoker is provided. The indoor smoker includes a firebox defining a primary outlet, a bypass outlet, a firebox inlet, and a smoldering chamber for receiving combustible material, a bypass duct providing fluid communication between the bypass outlet and an exhaust duct, a smoking chamber having a chamber inlet in fluid communication with the primary outlet, a chamber outlet in fluid communication with an exhaust duct, and an air inlet, and an air handler operably coupled with the exhaust duct for urging a flow of smoke through the exhaust duct. The method includes receiving a command to evacuate the smoking chamber, closing the primary outlet of the firebox, and operating the air handler to evacuate the smoking chamber by urging a flow of air through the air inlet, into the smoking chamber, and out of the exhaust duct.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
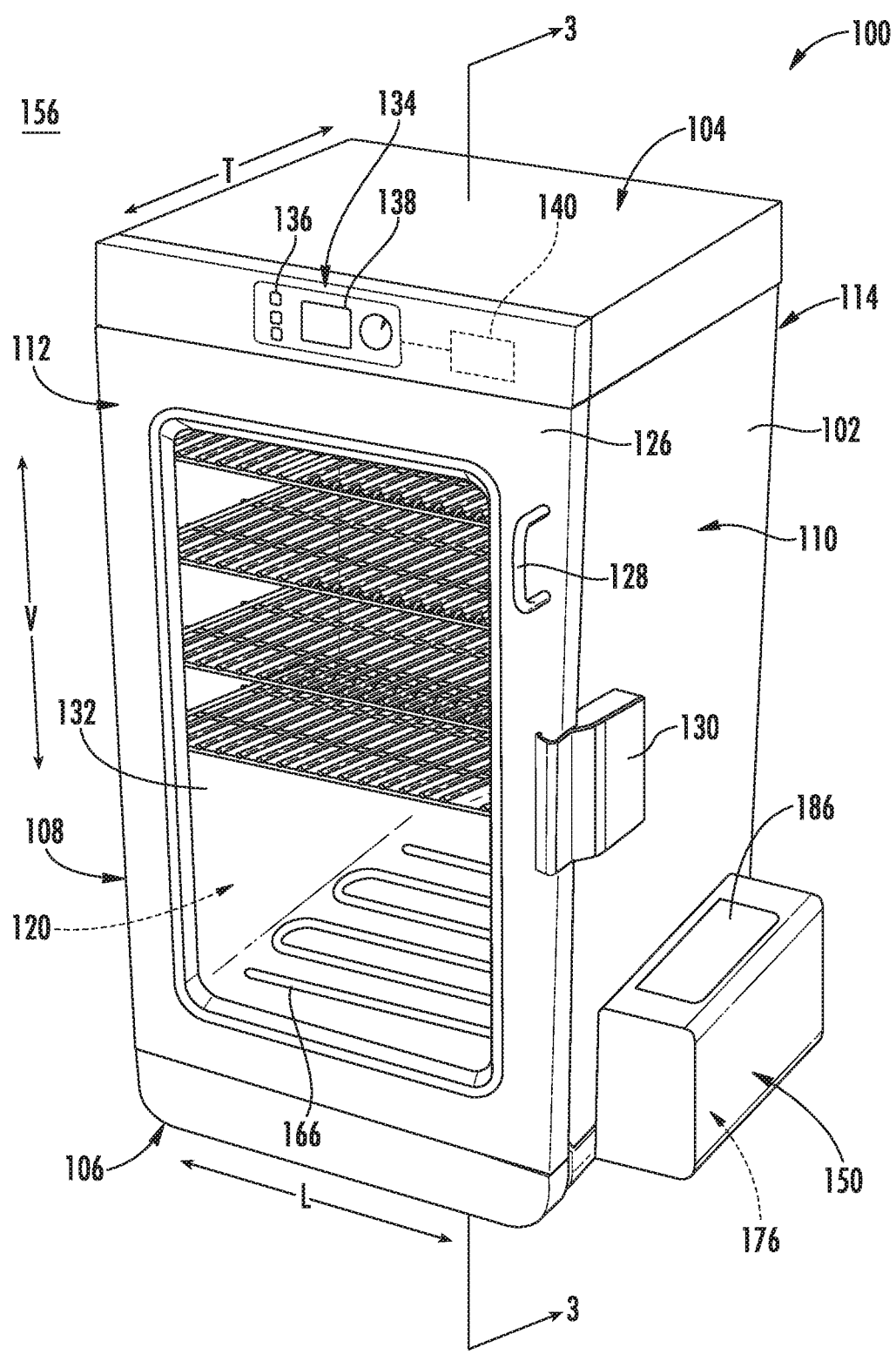
FIG. 1 provides a perspective view of an indoor smoker with all doors in a closed position in accordance with an example embodiment of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "upstream" and "downstream" refer to the relative direction with respect to fluid flow in a fluid pathway. For example, "upstream" refers to the direction from which the fluid flows, and "downstream" refers to the direction to which the fluid flows. In addition, as used herein, terms of approximation, such as "approximately," "substantially," or "about," refer to being within a ten percent margin of error. Furthermore, the term "smoke" is generally used to refer to the flow of air, smoke, combustion byproducts, or any combination thereof through an appliance.

Figure 2:
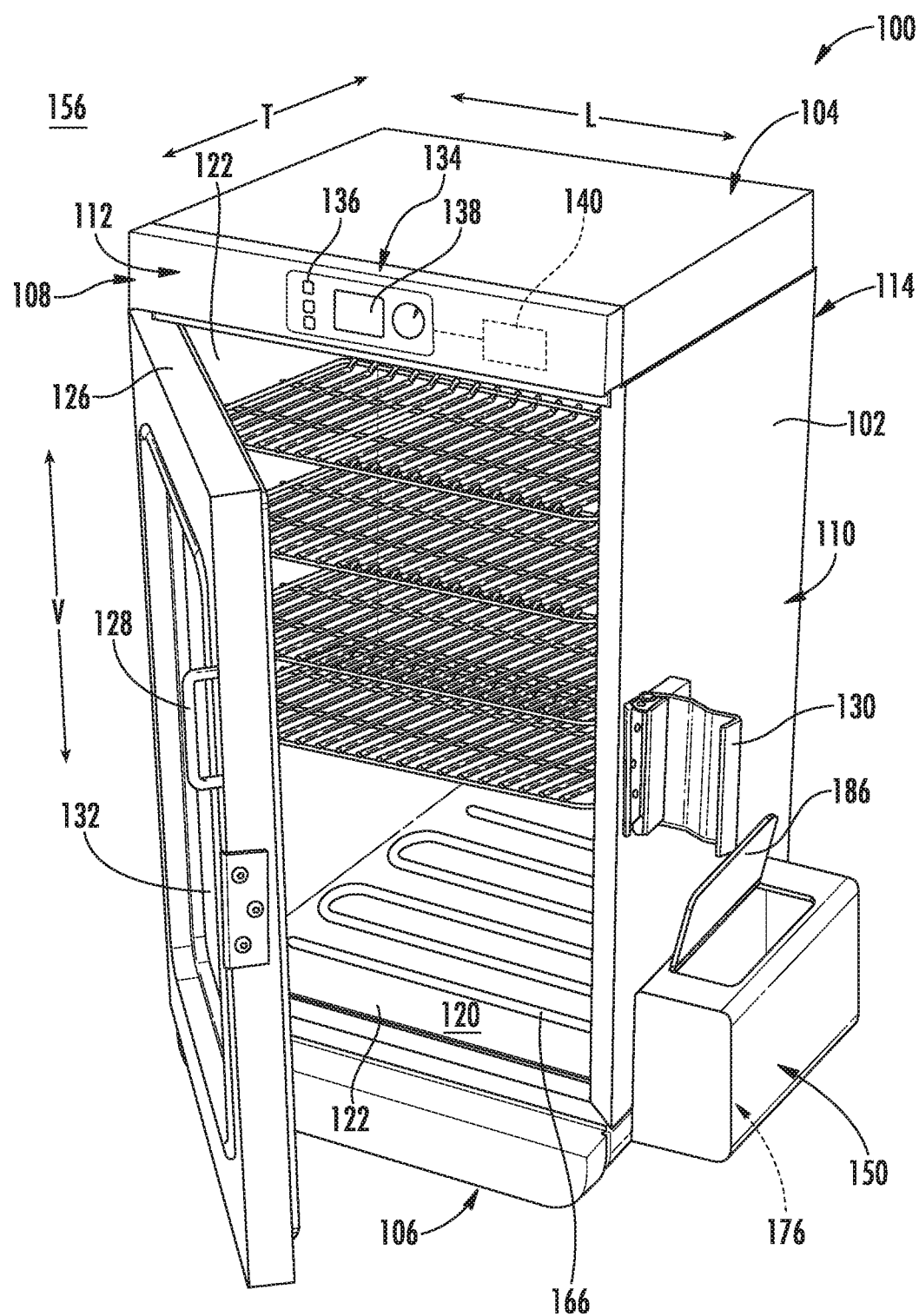
FIG. 2 provides a perspective view the exemplary indoor smoker of FIG. 1 with the doors opened.

FIGS. 1 and 2 provide perspective views of an indoor smoker 100 according to an exemplary embodiment of the present subject matter with doors in the closed position and the open position, respectively. Indoor smoker 100 generally defines a vertical direction V, a lateral direction L, and a transverse direction T, each of which is mutually perpendicular, such that an orthogonal coordinate system is generally defined. As illustrated, indoor smoker 100 includes an insulated cabinet 102. Cabinet 102 of indoor smoker 100 extends between a top 104 and a bottom 106 along the vertical direction V, between a first side 108 (left side when viewed from front) and a second side 110 (right side when viewed from front) along the lateral direction L, and between a front 112 and a rear 114 along the transverse direction T.

Within cabinet 102 is a smoking chamber 120 which is configured for the receipt of one or more food items to be cooked and/or smoked. In general, smoking chamber 120 is at least partially defined by a plurality of chamber walls 122. Specifically, smoking chamber 120 may be defined by a top wall, a rear wall, a bottom wall, and two sidewalls. These chamber walls 122 may define smoking chamber 120 and an opening through which a user may access food articles placed therein. In addition, chamber walls 122 may be joined, sealed, and insulated to help retain smoke and heat within smoking chamber 120. In this regard, for example, in order to insulate smoking chamber 120, indoor smoker 100 includes an insulating gap defined between chamber walls 122 and cabinet 102. According to an exemplary embodiment, the insulation gap is filled with insulating material 124 (see FIGS. 3 through 5), such as insulating foam or fiberglass.

Indoor smoker 100 includes a door 126 rotatably attached to cabinet 102 in order to permit selective access to smoking chamber 120. A handle 128 is mounted to door 126 to assist a user with opening and closing door 126 and a latch 130 is mounted to cabinet 102 for locking door 126 in the closed position during a cooking or smoking operation. In addition, door 126 may include one or more transparent viewing windows 132 to provide for viewing the contents of smoking chamber 120 when door 126 is closed and also to assist with insulating smoking chamber 120.

Referring still to FIGS. 1 and 2, a user interface panel 134 and a user input device 136 may be positioned on an exterior of cabinet 102. User interface panel 134 may represent a general purpose Input/Output ("GPIO") device or functional block. In some embodiments, user interface panel 134 may include or be in operative communication with user input device 136, such as one or more of a variety of digital, analog, electrical, mechanical or electro-mechanical input devices including rotary dials, control knobs, push buttons, and touch pads. User input device 136 is generally positioned proximate to user interface panel 134, and in some embodiments, user input device 136 may be positioned on user interface panel 134. User interface panel 134 may include a display component 138, such as a digital or analog display device designed to provide operational feedback to a user.

Generally, indoor smoker 100 may include a controller 140 in operative communication with user input device 136. User interface panel 134 of indoor smoker 100 may be in communication with controller 140 via, for example, one or more signal lines or shared communication busses, and signals generated in controller 140 operate indoor smoker 100 in response to user input via user input devices 136. Input/Output ("I/O") signals may be routed between controller 140 and various operational components of indoor smoker 100 such that operation of indoor smoker 100 can be regulated by controller 140.

Controller 140 is a "processing device" or "controller" and may be embodied as described herein. Controller 140 may include a memory and one or more microprocessors, microcontrollers, application-specific integrated circuits (ASICS), CPUs or the like, such as general or special purpose microprocessors operable to execute programming instructions or micro-control code associated with operation of indoor smoker 100, and controller 140 is not restricted necessarily to a single element. The memory may represent random access memory such as DRAM, or read only memory such as ROM, electrically erasable, programmable read only memory (EEPROM), or FLASH. In one embodiment, the processor executes programming instructions stored in memory. The memory may be a separate component from the processor or may be included onboard within the processor. Alternatively, controller 140 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Although aspects of the present subject matter are described herein in the context of an indoor smoker having a single smoking chamber, it should be appreciated that indoor smoker 100 is provided by way of example only. Other smoking appliances having different configurations, different appearances, and/or different features may also be utilized with the present subject matter, e.g., outdoor smokers, conventional oven appliances, or other suitable cooking appliances. Thus, the example embodiment shown in FIG. 1 is not intended to limit the present subject matter to any particular smoking configuration or arrangement. Moreover, aspects of the present subject matter may be used in any other consumer or commercial appliance where it is desirable to regulate a flow of smoke or heated air in an appliance.

Figure 3:
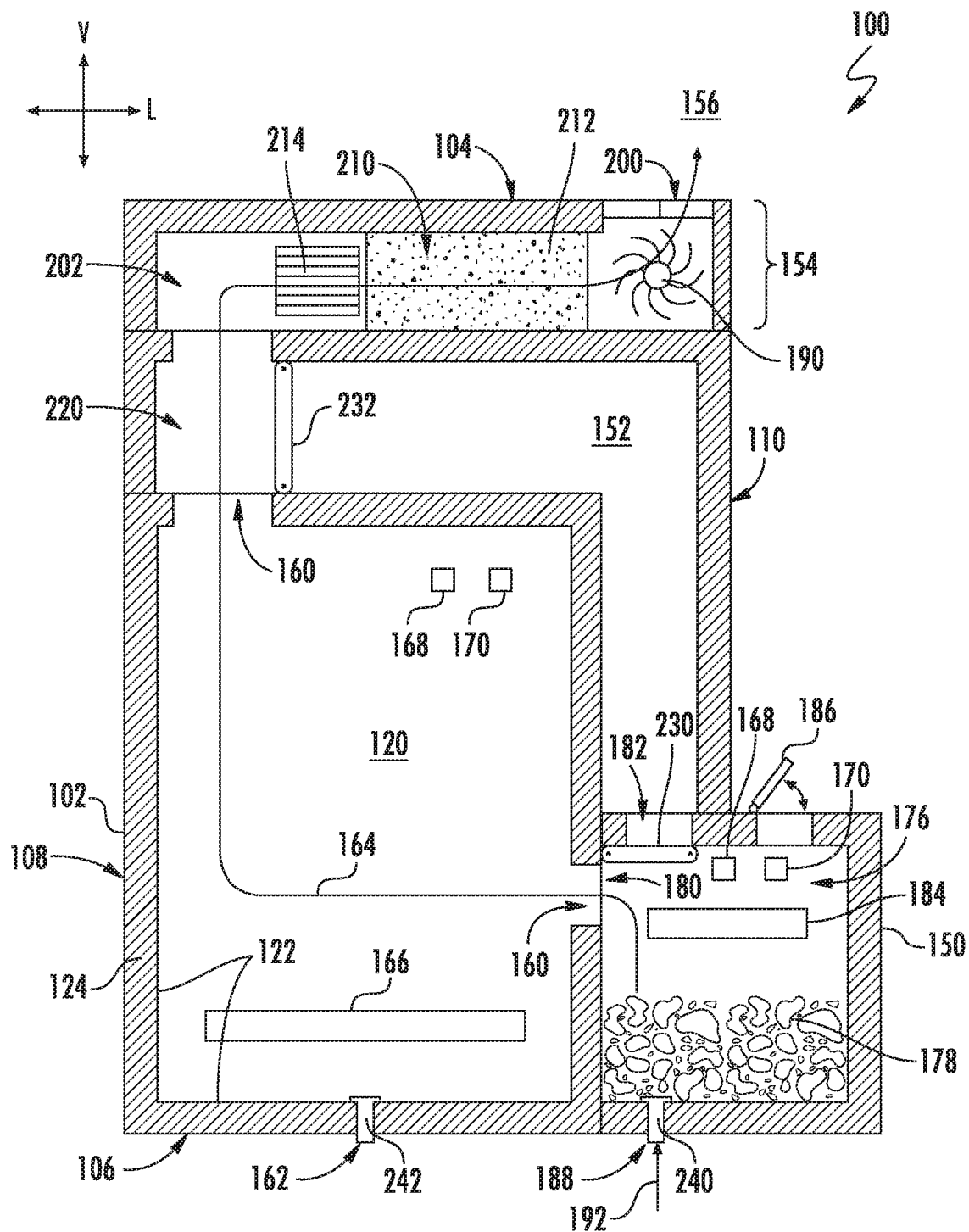
FIG. 3 provides a schematic, cross-sectional view of the exemplary indoor smoker of FIG. 1 taken along Line 3-3 of FIG. 1, with the indoor smoker configured for standard smoking operation.
Figure 4:
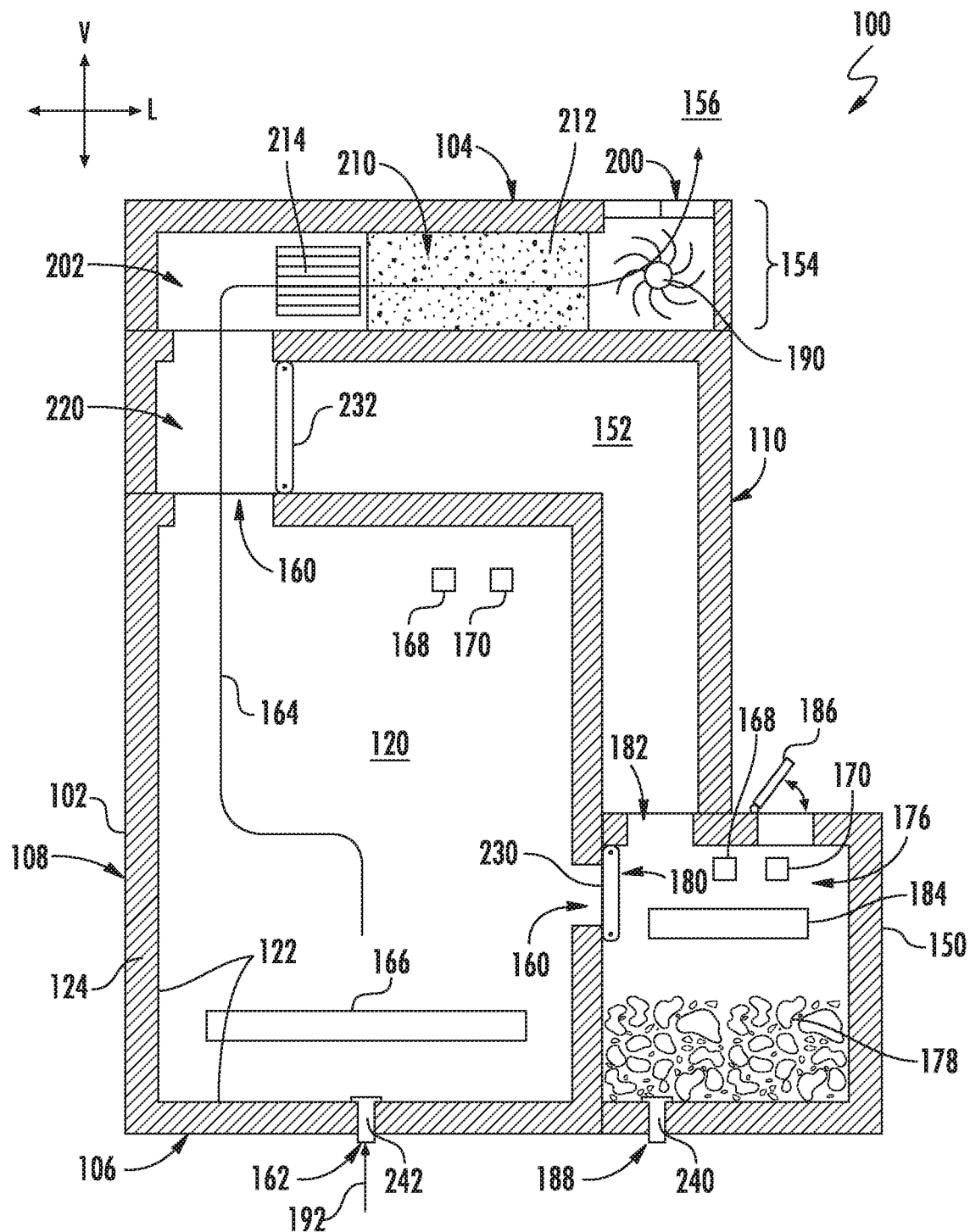
FIG. 4 provides a schematic, cross-sectional view of the exemplary indoor smoker of FIG. 1 taken along Line 3-3 of FIG. 1, with the indoor smoker configured for terminating the standard smoking operation.
Figure 5:
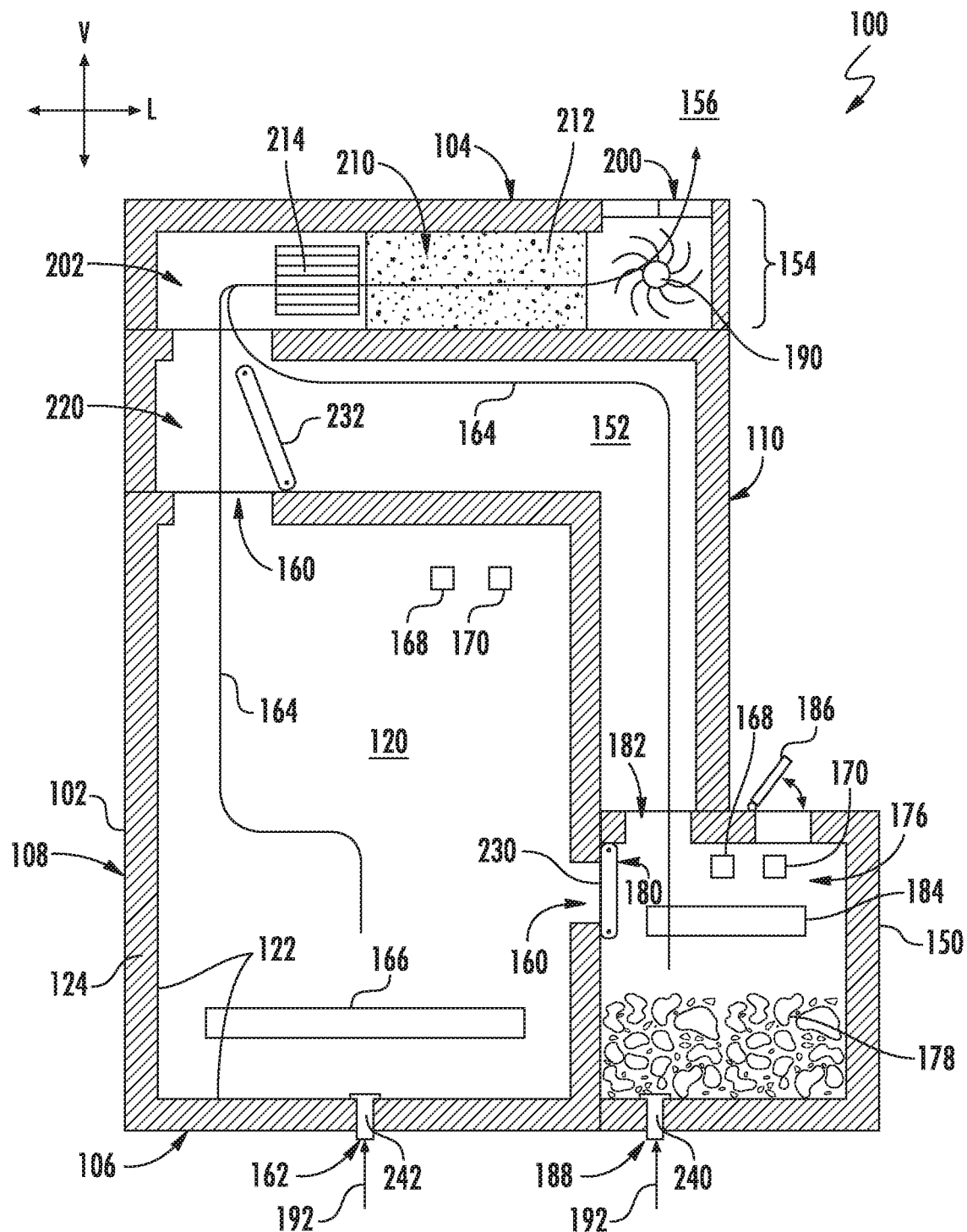
FIG. 5 provides a schematic, cross-sectional view of the exemplary indoor smoker of FIG. 1 taken along Line 3-3 of FIG. 1, with the indoor smoker configured for pausing the standard smoking operation.

Referring now also to FIGS. 3 through 5, various internal components of indoor smoker 100 and their respective functions will be described according to an exemplary embodiment of the present subject matter. In this regard, FIGS. 3 through 5 illustrate schematic cross-sectional views of indoor smoker 100 taken along Line 3-3 of FIG. 1. As shown, indoor smoker 100 generally includes smoking chamber 120 for receiving items to be cooked/smoked, a firebox 150 for generating smoke, a bypass duct 152 for routing low quality smoke around smoking chamber, and an exhaust system 154 for safely discharging that smoke into an indoor environment 156 (i.e., outside of indoor smoker 100). Each of these will be described in detail below.

As illustrated, smoking chamber 120 defines a chamber inlet 158, a chamber outlet 160, and an air inlet 162. During a smoking operation, a flow of smoke (identified in FIGS. 3 through 5 by reference numeral 164) is drawn into smoking chamber 120 through chamber inlet 158 is discharged from smoking chamber 120 through chamber outlet 160 and exhaust system 154. According to an exemplary embodiment, chamber inlet 158 is defined proximate a bottom 106 of smoking chamber 120 at one side (e.g., second side 110 as shown) and the chamber outlet 160 is defined proximate top 104 of smoking chamber 120 at an opposite side (e.g., first side 108 as shown). In this manner, the flow of smoke 164 may have a tendency of being drawn over and up through the entire smoking chamber 120 for improved smoke coverage.

According to the illustrated embodiment, air inlet 162 is defined in a bottom chamber wall 122 to permit fresh air to flow into smoking chamber 120, as described in more detail below. However, it should be appreciated that according to alternative embodiment, air inlet 162 may be positioned at any other suitable location that is in fluid communication with smoking chamber 120 such that a flow of fresh air may be drawn into smoking chamber by air handler 190 (described below) under certain conditions. In addition, it should be appreciated that depending on the configuration of the damper system (described below), air handler 190 may be configured for drawing in fresh air through air inlet 162, the flow of smoke 164 through chamber inlet 158, or any combination of air and smoke.

In order to ensure a desirable cooking temperature within smoking chamber 120, indoor smoker 100 further includes a chamber heater 166 that is positioned within or otherwise in thermal communication with smoking chamber 120 for regulating the temperature in smoking chamber 120. In general, chamber heater 166 may include one or more heating elements positioned within cabinet 102 for selectively heating smoking chamber 120. For example, the heating elements may be electric resistance heating elements, gas burners, microwave heating elements, halogen heating elements, or suitable combinations thereof. Notably, because chamber heater 166 is operated independently of firebox 150 (e.g., as described below), smoking chamber 120 may be maintained at any suitable temperature during a smoking process. More specifically, for example, chamber heater 166 may be turned off or on a very low setting for smoking cheeses or may be turned on high for quickly cooking and smoking meats.

In some embodiments, indoor smoker 100 also includes one or more sensors that may be used to facilitate improved operation of the appliance, such as described below. For example, indoor smoker 100 may include one or more temperature sensors and/or humidity sensors which are generally operable to measure the internal temperature and humidity in indoor smoker 100, e.g., within smoking chamber 120. More specifically, as illustrated, indoor smoker 100 includes a temperature sensor 168 and a humidity sensor 170 positioned within smoking chamber 120 and being operably coupled to controller 140. In some embodiments, controller 140 is configured to vary operation of chamber heater 166 based on one or more temperatures detected by temperature sensor 168 or humidity measurements from humidity sensor 170.

As described herein, "temperature sensor" may refer to any suitable type of temperature sensor. For example, the temperature sensors may be thermocouples, thermistors, or resistance temperature detectors. Similarly, "humidity sensor" may refer to any suitable type of humidity sensor, such as capacitive digital sensors, resistive sensors, and thermal conductivity humidity sensors. In addition, temperature sensor 168 and humidity sensor 170 may be mounted at any suitable location and in any suitable manner for obtaining a desired temperature or humidity measurement, either directly or indirectly. Although exemplary positioning of certain sensors is described below, it should be appreciated that indoor smoker 100 may include any other suitable number, type, and position of temperature and/or humidity sensors according to alternative embodiments.

Referring still to FIGS. 3 through 5, firebox 150 generally defines a smoldering chamber 176 which is configured for receiving combustible material 178. As used herein, "combustible material" is generally used to refer to any suitable material positioned within smoldering chamber 176 for generating smoke. Specifically, according to exemplary embodiments, combustible material 178 includes wood or wood byproducts, such as wood chunks, wood chips, wood pellets, or wood resin. Firebox 150 defines a primary outlet 180 that is fluidly coupled to chamber inlet 158 for providing the flow of smoke 164 into smoking chamber 120 during a smoking operation. In addition, firebox 150 defines a bypass outlet 182 through which the flow of smoke 164 may be expelled during certain conditions, as will be described in more detail below.

According to the illustrated embodiment, firebox 150 includes a smoldering heater 184 which is positioned in or otherwise in thermal communication with smoldering chamber 176 to smolder combustible material 178 stored in smoldering chamber 176. Similar to chamber heater 166, smoldering heater 184 may include one or more heating elements such as electric resistance heating elements, gas burners, microwave heating elements, halogen heating elements, or suitable combinations thereof. In addition, firebox 150 may include a dedicated temperature sensor 168 and humidity sensor 170 for detecting the temperature and humidity within smoldering chamber 176 for improved smoke generation and regulation.

As used herein, the verb "smolder" or variations thereof is intended to refer to burning a combustible material (e.g., combustible material 178) slowly such that smoke is generated but little or no flame is generated. In this manner, the combustible material is not expended quickly, but a large amount of smoke is generated for the smoking process. Notably, the burn rate of combustible material and the amount of smoke generated is regulated using smoldering heater 184 positioned within smoldering chamber 176. For typical combustible material used in smokers, e.g., wood and wood byproducts, a typical smoldering temperature is between about 650° F. and 750° F. However, the exact temperature may vary depending on the combustible material used, the air flow rate through smoldering chamber 176, the level of combustible material 178, and other factors.

According to the exemplary embodiment, firebox 150 may include a door 186 which is pivotally mounted on top of firebox 150 for providing selective access to smoldering chamber 176, e.g., to add additional combustible material 178. In addition, firebox 150 defines an air inlet or a firebox inlet 188 for receiving air to support the combustion or smoldering process. More specifically, as will be described in more detail below, indoor smoker 100 include an air handler 190 for urging a flow of air (indicated by reference numeral 192 in FIGS. 3 through 5) into smoldering chamber 176 through firebox inlet 188 for facilitating the smoldering process and smoke generation. Controller 140 is generally configured for regulating smoldering heater 184 and air handler 190 to achieve the desired smoldering of combustible material 178 and the desired amount of smoke within smoking chamber 120.

As mentioned briefly above, indoor smoker 100 further includes an exhaust system 154 which is generally configured for safely discharging the flow of smoke 164 from indoor smoker 100. Specifically, according to the illustrated embodiment, exhaust system 154 generally extends between chamber outlet 160 and a discharge vent 200 defined by cabinet 102 for directing the flow of smoke 164 from smoking chamber 120 to the environment 156. Although an exemplary exhaust system 154 is described below, it should be appreciated that variations and modifications may be made while remaining within the scope of the present subject matter. For example, the routing of ducts, the position of fans and dampers, and the types of sensors used may vary according to alternative embodiments.

As shown, exhaust system 154 includes an exhaust duct 202 that generally extends between and provides fluid communication between chamber outlet 160 and discharge vent 200. Air handler 190 is operably coupled with exhaust duct 202 for urging the flow of smoke 164 through exhaust duct 202 and out of discharge vent 200 to environment 156. According to the illustrated exemplary embodiment, air handler 190 is a tangential fan positioned within exhaust duct 202. However, it should be appreciated that according to alternative embodiments, air handler 190 may be positioned at any other suitable location and may be any other suitable fan type, such as an axial fan, a centrifugal fan, etc. In addition, according to an exemplary embodiment, air handler 190 is a variable speed fan such that it may rotate at different rotational speeds, thereby generating different air flow rates. In this manner, the amount of smoke drawn from smoldering chamber 176 may be continuously and precisely regulated. In addition, as will be described in more detail below, air handler 190 may be operated in a boost mode to quickly evacuate smoking chamber 120 of smoke.

Referring still to FIGS. 3 through 5, indoor smoker 100 further includes a catalytic converter 210 which is positioned within exhaust duct 202 for lowering or removing volatile organic compounds (VOCs) from the flow of smoke 164. As used herein, "catalytic converter" or variations thereof may be used to refer to any component, machine, or device that is configured for removing or lowering volatile organic compounds (VOCs), toxic gases, harmful emissions, pollutants, or undesirable compounds from a flow of air and smoke. For example, according to the illustrated embodiment, catalytic converter 210 generally includes a catalytic element 212 and a catalyst heater 214. In general, catalytic element 212 includes a material that causes an oxidation and a reduction reaction. For example, precious metals such as platinum, palladium, and rhodium are commonly used as catalyst materials, though other catalysts are possible and within the scope of the present subject matter. In operation, the catalytic element 212 may combine oxygen ($O_2$) with carbon monoxide (CO) and unburned hydrocarbons to produce carbon dioxide ($CO_2$) and water ($H_2O$). In addition, according to exemplary embodiments, catalytic element 212 may remove nitric oxide (NO) and nitrogen dioxide ($NO_2$).

Notably, catalytic converters typically require that the catalyst be heated to a suitably high temperature in order to catalyze the necessary chemical reactions. Therefore, catalyst heater 214 is in thermal communication with catalytic element 212 for heating it to a suitable temperature, such as approximately 800° F. According to the illustrated embodiment, catalyst heater 214 is positioned upstream of catalytic element 212 to provide thermal energy through convection. However, it should be appreciated that according to alternative embodiments, catalyst heater 214 may be in direct contact with catalytic element 212 to provide thermal energy through conduction, or may be thermally coupled to catalytic element 212 in any other suitable manner.

Thus, during operation of indoor smoker 100 in a "normal operating mode," air handler 190 draws the flow of air 192 into smoldering chamber 176 through firebox inlet 188. The flow of air 192 and combustible material 178 in the smoldering chamber 176 generate the flow of smoke 164 which is drawn into smoking chamber 120 through chamber inlet 158. The flow of smoke 164 passes through smoking chamber 120 for performing a smoking process on food items positioned therein before exiting smoking chamber 120 through chamber outlet 160. Air handler 190 and continues to urge the flow of smoke 164 through catalytic converter 210 and exhaust duct 202 before passing out discharge vent 200.

As explained in more detail below, indoor smoker 100 may include bypass duct 152 and damper systems which are generally configured for directing the flow of smoke 164 into or around smoking chamber 120 depending on the mode of operation of indoor smoker 100. Specifically, referring now to FIGS. 3 through 5, indoor smoker 100 includes bypass duct 152 that extends between and provides fluid communication between bypass outlet 182 and exhaust duct 202. More specifically, according to the illustrated embodiment, bypass duct 152 is positioned within cabinet 102 and extends around a perimeter of smoking chamber 120 from a top of firebox 150 to the exhaust duct 202. In this regard, the exhaust duct 202 may generally include a discharge plenum 220 which is directly fluidly coupled with the chamber outlet 160 and a discharge of bypass duct 152 and feeds the flow of smoke 164 into exhaust duct 202. Although smoking chamber 120 and bypass duct 152 are illustrated as being coupled to exhaust duct 202 through discharge plenum 220, it should be appreciated that they may be fluidly coupled at any other suitable location along exhaust duct 202.

In addition, indoor smoker 100 may include a system of dampers designed to regulate the flow of smoke 164 through cabinet 102. Specifically, according to the illustrated embodiment, indoor smoker 100 includes a firebox damper 230 that is rotatably mounted within smoldering chamber 176 and is movable between a first position where primary outlet 180 is substantially blocked and a second position where bypass outlet 182 is substantially blocked. Similarly, indoor smoker 100 includes an exhaust damper 232 that is rotatably mounted within the exhaust duct 202, or more specifically, within discharge plenum 220. Similar to firebox damper 230, exhaust damper 232 is movable between a first position where chamber outlet 160 is substantially blocked and the second position where bypass duct 152 is substantially blocked.

Notably, as describe in more detail below, the damper positions described above may generally be associated with specific operating modes of indoor smoker 100. More specifically, the "first position" (e.g., as illustrated in FIG. 3) is generally associated with the startup/overshoot mode because firebox damper 230 blocks primary outlet 180 and exhaust damper 232 blocks chamber outlet 160 to prevent low quality smoke from entering smoking chamber 120. By contrast, the "second position" (e.g., as illustrated in FIG. 4) is generally associated with the operating mode because firebox damper 230 blocks bypass outlet 182 and exhaust damper 232 blocks bypass duct 152 to direct all generated smoke through smoking chamber 120. Thus, according to an exemplary embodiment, exhaust damper 232 is configured to move in unison with firebox damper 230, i.e., between the first and second positions.

According to exemplary embodiments, firebox damper 230 and exhaust damper 232 may be configured to move in unison between the first and second positions. According to other embodiments, firebox damper 230 and exhaust damper 232 may be operated independently of each other and may be positioned at any suitable intermediate position between the first position and the second position. In addition, indoor smoker 100 may include only a single damper according to exemplary embodiments. For example, indoor smoker 100 may include only firebox damper 230 which is generally closes off primary outlet 180 when smoke is not desired in smoking chamber 120, and blocks bypass duct 152 during the normal operating mode. Notably, in such a configuration, chamber outlet 160 remains open, potentially permitting the flow of smoke 164 from entering smoking chamber 120 through chamber outlet 160. However, in such an embodiment, air handler 190 may be configured for drawing a sufficient amount of air to prevent backflow into chamber outlet 160 and/or bypass duct 152 may be coupled to exhaust duct 202 at a location downstream from chamber outlet 160, thereby reducing the likelihood of smoke passing into the chamber outlet 160.

According to exemplary embodiments, controller 140 may be operably coupled with firebox damper 230, exhaust damper 232, and/or temperature and humidity sensors 168, 170 for regulating the operation of the damper system to achieve the desired flow of smoke. In this regard, as described in more detail below, firebox damper 230 and/or exhaust damper 232 may be moved from the first position to the second position when a firebox temperature reaches a predetermined lower temperature threshold, such as 650° F. If the firebox temperature reaches a predetermined upper temperature threshold, such as 750° F., firebox damper 230 and/or exhaust damper 232 may be moved from the second position back to the first position.

Referring again to FIGS. 3 through 5, indoor smoker 100 may further include features for preventing the flow of air 192 from entering indoor smoker 100 from environment 156 when the flow of such air is not desired. In this regard, for example, indoor smoker 100 may include a firebox check valve 240 which is operably coupled to firebox inlet 188 and a chamber check valve 242 which is operably coupled to air inlet 162 of smoking chamber 120. In general, these check valves prevent the flow of air 192 from entering indoor smoker 100 when not desired and prevent the flow of smoke 164 from passing from smoking chamber 120 or smoldering chamber 176 out of indoor smoker 100 into environment 156. In addition, each of these check valves may have a "cracking pressure," which is used herein to refer to the pressure, or more precisely the negative pressure, required within smoldering chamber 176 to open firebox check valve 240 or the negative pressure required within smoking chamber 120 to open chamber check valve 242 to draw in air 192 through those respective inlets.

For example, firebox check valve 240 may have a cracking pressure that is sufficient to prevent the flow of air 192 from passing into smoldering chamber 176 through firebox inlet 188 when firebox damper 230 is in the first position and exhaust damper 232 is in the second position, e.g. such that bypass duct 152 and smoldering chamber 176 are closed. In this manner, firebox check valve 240 may facilitate the quick and effective asphyxiation of combustible material 178 within smoldering chamber 176. In addition, chamber check valve 242 may have a cracking pressure that is sufficient to prevent a flow of air 192 from passing into smoking chamber 120 unless air handler 190 is operating in the boost mode. In this manner, chamber check valve 242 is prevented from opening to let in the flow of air 192 during a normal mode of operation. Notably, firebox check valve 240 may have a lower cracking pressure than chamber check valve 242 to permit the flow of air 192 to enter smoldering chamber 176 through firebox inlet 188 but not smoking chamber 120 through air inlet 162 during normal operation.

Now that the construction and configuration of indoor smoker 100 has been described according to an exemplary embodiment of the present subject matter, an exemplary method 300 for regulating a flow of smoke within or otherwise operating an indoor smoker will be described according to an exemplary embodiment of the present subject matter. Method 300 can be used to operate indoor smoker 100, or any other smoker or cooking appliance. It should be appreciated that the exemplary method 300 is discussed herein only to describe exemplary aspects of the present subject matter, and is not intended to be limiting.

Method 300 generally comprises receiving a command to enter a certain operating mode or to perform a particular process and performing one or more steps or control actions in response to that command. In this regard, the command may be received from a user, e.g., using user input device 136, such as when a user wants to pause the smoking process to mop the food or add additional food. Alternatively, the command may be received from controller 140, e.g., such as when a timed cooking or smoking cycle has finished and it is desirable to evacuate the smoking chamber. It should be appreciated that the commands described below, the steps taken in response to those commands, and the application of method 300 using indoor smoker 100 are used only for the purpose of explanation herein. Variations and modifications may be made to method 300 while remaining within the scope of the present subject matter.

Figure 6:
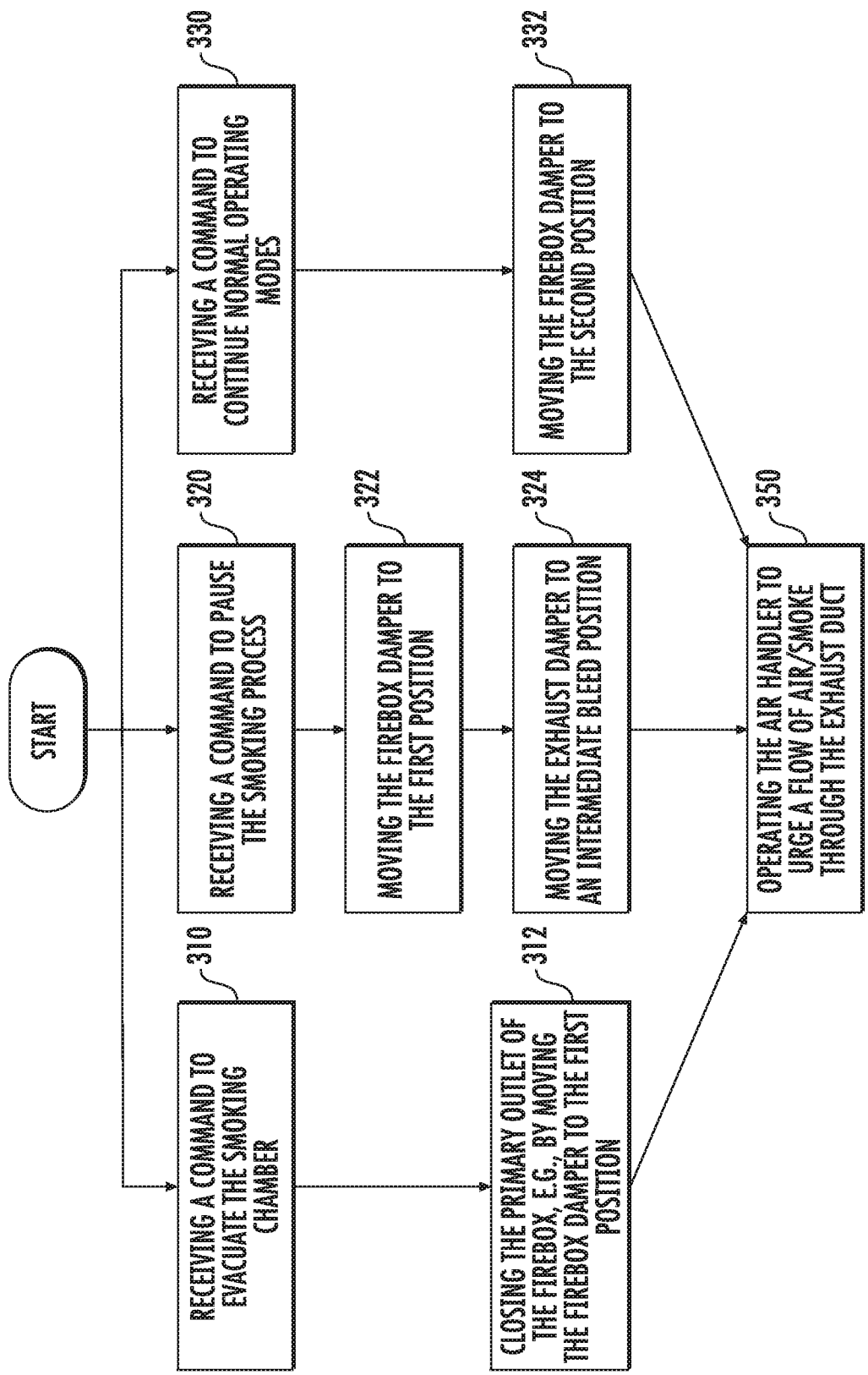
FIG. 6 is a method of regulating a flow of smoke in an indoor smoker according to an example embodiment of the present subject matter.

Referring now to FIG. 6, method 300 includes, at step 310, receiving a command to evacuate the smoking chamber. For example, the command to evacuate the smoking chamber may be received at the end of the cooking process when a user wants to extinguish combustible material 178 in smoldering chamber 176 and remove smoke from within smoking chamber 120 so that door 126 may be opened and the food may be accessed.

According to an exemplary embodiment, step 312 includes closing the primary outlet of the firebox. According to the exemplary embodiment above, primary outlet 180 may be closed by moving firebox damper 230 to the first position such that the flow of smoke 164 may not pass into smoking chamber 120 through chamber inlet 158. In addition, step 312 may include closing bypass duct 152, e.g., by moving exhaust damper 232 to the second position such that smoke 164 may not flow back into smoking chamber 120 through chamber outlet 160. After firebox damper 232 is in the first position, method 300 further includes, at step 350, operating the air handler to urge a flow of air/smoke through the exhaust duct. In this manner, for example, urging the flow of smoke 164 through exhaust duct 202 draws the flow of smoke 164 out of smoking chamber 120 and the flow of fresh air 192 in through air inlet 162 of smoking chamber 120. Thus, the smoke within smoking chamber 120 is quickly discharged through the exhaust duct 202 and a user may access food within smoking chamber 120 by opening door 126.

According to an exemplary embodiment of the present subject matter, air handler 190 may be configured for operating in a "boost" mode to more quickly and effectively evacuate smoke from smoking chamber 120. As used herein, "boost" mode is generally intended to refer to a situation where air handler 190 is operating at a substantially higher flow rate than its ideal normal operating flow rate, e.g., such as during a normal smoking procedure. Notably, according to an exemplary embodiment where indoor smoker 100 does not include exhaust damper 232, air handler 190 may operate in the boost mode to prevent the flow of smoke 164 from flowing through bypass duct 152 back into smoking chamber 120 through chamber outlet 160.

Referring still to FIG. 6, during certain situations, a user may wish to access food within smoking chamber 120 without extinguishing combustible material 178 within smoldering chamber 176. Therefore, step 320 includes receiving a command to pause the smoking process. For example, such command may be initiated by a user when it is desirable to mop food within smoking chamber 120 or to add additional food. When such a command is received, indoor smoker 100 is generally configured for evacuating smoke within smoking chamber 120 while providing a sufficient amount of air into smoldering chamber 176 to prevent asphyxiation of combustible material 178.

To achieve this, step 322 includes moving the firebox damper to the first position. This prevents the flow of smoke 164 from within smoldering chamber 176 from entering into smoking chamber 120 through chamber inlet 158. In addition, step 324 includes moving the exhaust damper to an intermediate bleed position. For example, exhaust damper 232 may be positioned at any suitable location between the first position and the second position. One such position is the intermediate position, which for example is within 10 degrees of the second position. In this manner, bypass duct 152 is opened very slightly to permit a sufficient amount of air into smoldering chamber 176 to prevent asphyxiation without generating so much smoke that the likelihood of smoke entering smoking chamber 120 is increased. Similar to prior operations, step 350 includes operating an air handler 190 to urge a flow of air and smoke through smoking chamber 120 and a flow of bleed air and smoke through smoldering chamber 176 and bypass duct 152.

During startup of indoor smoker or after the process is paused and the user no longer needs to access smoking chamber 120, it may be desirable to continue normal operation of indoor smoker 100. Thus, step 330 includes receiving a command to continue normal operating mode. In general, normal operating mode refers to the configuration and operation of indoor smoker 100 where air handler 190 is operating at its optimal flow rate in drawing a flow of smoke 164 from smoldering chamber 176 into smoking chamber 120. Notably, during normal operation, it may be desirable to prevent the flow of air 192 from entering smoking chamber 120 through air inlet 162. Thus, chamber check valve 242 may have a cracking pressure that is sufficient to prevent that flow of air 192 from passing into smoking chamber 120 unless air handler 190 is operating in a boost mode (e.g. such as it is when the evacuating smoking chamber 120).

According to an exemplary embodiment, to continue the normal operating mode, step 332 includes moving the firebox damper to the second position. For example, when firebox damper 230 is in the second position, bypass duct 152 is blocked and the flow of smoke 164 generated within smoldering chamber 176 is passed through chamber inlet 158 into smoking chamber. At step 350, air handler 190 may be operated to continuously draw this flow of smoke 164 through smoking chamber 120 to perform a smoking process before discharging the flow of smoke 164 through exhaust duct 202 and out discharge vent 202.

FIG. 5 depicts an exemplary method having steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the methods are explained using indoor smoker 100 as an example, it should be appreciated that these methods may be applied to regulate smoke in any other smoking appliance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An indoor smoker defining a vertical, a lateral, and a transverse direction, the indoor smoker comprising:
    a cabinet including an exhaust duct;
    an air handler operably coupled with the exhaust duct for urging a flow of smoke through the exhaust duct;
    a firebox defining a primary outlet, a bypass outlet, a firebox inlet, and a smoldering chamber for receiving combustible material;
    a bypass duct providing fluid communication between the bypass outlet and the exhaust duct;
    a smoking chamber positioned within the cabinet and defining a chamber inlet in fluid communication with the primary outlet, a chamber outlet in fluid communication with the exhaust duct, and an air inlet; and
    a controller operably coupled to the air handler, the controller being configured for:
        receiving a command to evacuate the smoking chamber;
        closing the primary outlet of the firebox; and
        operating the air handler to evacuate the smoking chamber by urging a flow of air through the air inlet, into the smoking chamber, and out of the exhaust duct.

2. The indoor smoker of claim 1, comprising:
    a firebox damper being movable between a first position where the primary outlet is blocked and a second position where the bypass outlet is blocked, wherein closing the primary outlet comprises moving the firebox damper to the first position.

3. The indoor smoker of claim 2, wherein the controller is further configured for:
    closing the bypass duct in response to receiving a command to evacuate the smoking chamber.

4. The indoor smoker of claim 3, comprising:
    an exhaust damper mounted within the exhaust duct, the exhaust damper being movable between a first position where the chamber outlet is blocked and a second position where the bypass duct is blocked, wherein closing the bypass duct comprises moving the exhaust damper to the second position.

5. The indoor smoker of claim 4, wherein the controller is further configured for:
    receiving a command to pause the smoking process;
    moving the firebox damper to the first position;

moving the exhaust damper to an intermediate bleed position between the first position and the second position; and operating the air handler to urge the flow of air through the smoking chamber and the flow of smoke through bypass duct.

6. The indoor smoker of claim 5, wherein the intermediate bleed position is where the exhaust damper is within 10 degrees of the second position.

7. The indoor smoker of claim 2, wherein the controller is further configured for:

receiving a command to continue normal operating mode;

moving the firebox damper to the second position; and operating air handler to urge the flow of smoke from the smoldering chamber, through the smoking chamber, and out the exhaust duct.

8. The indoor smoker of claim 1, wherein operating the air handler to evacuate the smoking chamber comprises operating the air handler in a boost mode of operation.

9. The indoor smoker of claim 1, comprising:

a firebox check valve operably coupled to the firebox inlet; and a chamber check valve operably coupled to the air inlet.

10. The indoor smoker of claim 9, wherein the firebox check valve has a cracking pressure that is sufficient to prevent the flow of air from passing into the smoldering chamber through the firebox inlet when the firebox damper is in the first position and the exhaust damper is in the second position.

11. The indoor smoker of claim 9, wherein the chamber check valve has a cracking pressure that is sufficient to prevent a flow of air from passing into the smoking chamber through the air inlet unless the air handler is operating in a boost mode.

12. The indoor smoker of claim 1, comprising:

a catalytic converter positioned within the exhaust duct for lowering volatile organic compounds within the flow of smoke.

* * * * *